(12) United States Patent
Sundararajan et al.

(10) Patent No.: US 12,461,138 B2
(45) Date of Patent: Nov. 4, 2025

(54) CIRCUITRY AND METHODS FOR MONITORING POWER CONVERSION CIRCUITRY

(71) Applicant: ROLLS-ROYCE PLC, London (GB)

(72) Inventors: Prasanth Sundararajan, Singapore (SG); Mohamed Sathik Mohamed Halick, Singapore (SG); Chandana J Gajanayake, Singapore (SG); Amit K Gupta, Singapore (SG)

(73) Assignee: ROLLS-ROYCE plc, London (GB)

( * ) Notice: Subject to any disclaimer, the term of this patent is extended or adjusted under 35 U.S.C. 154(b) by 237 days.

(21) Appl. No.: 18/226,597

(22) Filed: Jul. 26, 2023

(65) Prior Publication Data

US 2024/0069089 A1 Feb. 29, 2024

(30) Foreign Application Priority Data

Aug. 24, 2022 (GB) ..................... 2212285

(51) Int. Cl.
*G01R 31/26* (2020.01)
*H02M 1/00* (2006.01)
(Continued)

(52) U.S. Cl.
CPC ...... *G01R 31/2607* (2013.01); *H02M 1/0009* (2021.05); *H02M 1/08* (2013.01); *H02M 5/293* (2013.01)

(58) Field of Classification Search
CPC .. G01R 31/2607; H02M 1/0009; H02M 1/08; H02M 5/293; H02M 1/32
See application file for complete search history.

(56) References Cited

U.S. PATENT DOCUMENTS 9,154,044 B2   10/2015   Choi et al.
9,535,107 B2    1/2017   Yang
(Continued)

FOREIGN PATENT DOCUMENTS

EP   2940850 A1   11/2015
EP   3690463 A1   8/2020
WO   2017/099768 A1   6/2017

OTHER PUBLICATIONS

Jan. 22, 2024 Extended Search Report issued in European Patent Application No. 23187185.6.
(Continued)

*Primary Examiner* — Adolf D Berhane
*Assistant Examiner* — Afework S Demisse
(74) *Attorney, Agent, or Firm* — Oliff PLC

(57) ABSTRACT

Monitoring circuitry connectable to power conversion circuitry enclosed within packaging, the power conversion circuitry including terminals providing external connections to nodes of the power conversion circuitry enclosed within the packaging, the monitoring circuitry including: a comparator including a first input terminals connectable to first and second terminals of the power conversion circuitry and a second input terminal connected to a reference voltage, wherein the first and second terminals provide external connections to first and second nodes connected along respective current paths each connected to switching circuitry of the power conversion circuitry enclosed within the packaging, wherein the comparator detects a switch state of the switching circuitry based on a voltage generated at the first input terminal and the reference voltage; processing circuitry connected to the comparator and configured to monitor the power conversion circuitry based on the detected switch state and a signal of the power conversion circuitry.

19 Claims, 7 Drawing Sheets

(51) Int. Cl.
*H02M 1/08* (2006.01)
*H02M 5/293* (2006.01)

(56) References Cited

U.S. PATENT DOCUMENTS

| | | | |
|---|---|---|---|
| 10,958,166 B1* | 3/2021 | Low | G05F 1/565 |
| 11,671,029 B2* | 6/2023 | Telefus | G11C 27/024 |
| | | | 323/285 |
| 2014/0032145 A1 | 1/2014 | Yoo | |
| 2016/0282392 A1 | 9/2016 | Lee et al. | |
| 2020/0241067 A1 | 7/2020 | Mohamed Halick et al. | |
| 2020/0271722 A1 | 8/2020 | van Oevelen | |
| 2023/0136027 A1* | 5/2023 | Szczeszynski | H02M 3/158 |
| | | | 323/271 |
| 2023/0142335 A1* | 5/2023 | Szczeszynski | H02M 1/0095 |
| | | | 363/78 |

OTHER PUBLICATIONS

Feb. 21, 2023 Search Report issued in British Patent Application No. 2212285.7.

"Turbine Laser Machining". Waterjet Laser Cooling Hole Drilling in Turbine Blades Airfoils and Waterjet Laser Air Seal Slot Milling in Turbine Vanes, retrieved on Jul. 7, 2023, <URL: https://web.archive.org/web/20210419164446/https:/www.avonisys.com/waterjet-laser-cooling-hole-drilling-in-turbine-blades-airfoils-and-waterjet-laser-air-seal-slot-milling-in-turbine-vanes.html>.

Huai Wang et al. "Degradation Testing and Failure Analysis of DC Film Capacitors Under High Humidity Conditions". Microelectronics Reliability, 2015, pp. 1-5.

C.A. Mcnally et al. "Laser Drilling of Cooling Holes in Aeroengines: State of the Art and Future Challenges". Materials Science and Technology, Jul. 2004, vol. 20, pp. 805-813.

* cited by examiner

CIRCUITRY AND METHODS FOR MONITORING POWER CONVERSION CIRCUITRY

This specification is based upon and claims the benefit of priority from UK Patent Application Number 2212285.7 filed on 24 Aug. 2022, the entire contents of which are incorporated herein by reference.

BACKGROUND

Field of the Disclosure

The present disclosure relates to circuitry and methods for monitoring power conversion circuitry.

Background of the Disclosure

Existing techniques for monitoring power conversion circuitry typically require direct access to components and/or processing circuitry of the power conversion circuitry. Such techniques are not suitable for monitoring commercial off the shelf (COTS) power conversion circuitry.

It will be understood that improvements in techniques for monitoring power conversion circuitry are desirable.

SUMMARY OF THE DISCLOSURE

According to a first aspect there is provided monitoring circuitry connectable to power conversion circuitry enclosed within packaging, the power conversion circuitry comprising terminals providing external connections to nodes of the power conversion circuitry enclosed within the packaging, the monitoring circuitry comprising a comparator comprising a first input terminal connectable to first and second terminals of the power conversion circuitry and a second input terminal connected to a reference voltage, wherein the first and second terminals provide external connections to first and second nodes connected along respective current paths each connected to switching circuitry of the power conversion circuitry enclosed within the packaging, wherein the comparator detects a switch state of the switching circuitry based on a voltage generated at the first input terminal and the reference voltage; processing circuitry connected to the comparator and configured to monitor the power conversion circuitry based on the detected switch state and a signal of the power conversion circuitry.

The monitoring circuitry may be configured to be connected to the power conversion circuitry such that monitoring of the power conversion circuitry may be performed by the monitoring circuitry.

The monitoring circuitry may enable equipment health monitoring (EHM) and remaining useful life estimation (e.g. of capacitors in a power conversion circuitry) in COTS power conversion circuitry without requiring any modification to design and/or structure of the COTS power conversion circuitry.

Further, the monitoring circuitry may be applied to existing COTS power conversion circuitry by accessing terminals that are already available to a user (without the need for expensive current sensors).

The monitoring circuitry may monitor the general operation of the power conversion circuitry and/or may monitor the condition of specific component(s) of the power conversion circuitry (e.g. a capacitor).

The monitoring circuitry may be directly connected to the power conversion circuitry.

The monitoring circuitry may be directly connected to terminals of the power conversion circuitry in order to perform monitoring.

The comparator may be comparator circuitry configured to compare two voltages and output a digital signal indicating which of the two voltages is larger.

The first input terminal of the comparator may be directly connected to the first and second terminals of the power conversion circuitry.

The reference voltage may by selected based on a voltage rating of the switching circuitry.

The comparator may output a digital signal indicating whether the switch state of the switching circuitry is high (off) or low (on).

The comparator may detect the switch state based on voltages generated at the first and second terminals of the power conversion circuitry.

The processing circuitry may be a microprocessor or a field programmable gate array (FPGA) for example.

The processing circuitry may monitor the power conversion circuitry continuously or intermittently (for example, during predetermined monitoring period, e.g. every 10 micro second or every second).

The signal of the power conversion circuitry may be a current signal or a voltage signal obtained from a terminal of the power conversion circuitry by the monitoring circuitry.

The power conversion circuitry may be completely enclosed within the packaging thereby preventing access to components of the power conversion circuitry.

The terminals of the power conversion circuitry may be directly connected to one or more nodes of the power conversion circuitry.

The terminals of the power conversion circuitry may project though the packaging to an external surface of the packaging thereby providing an external connection to internal nodes of the power conversion circuitry.

The switching circuitry may comprise one or more transistors connected to respective current paths.

The first and second nodes may be connected along respective current paths on opposite sides of the switching circuitry.

The power conversion circuitry may be a front-end (active or passive) rectifier fed three-phase two-level converter. Alternatively, the power conversion circuitry may be a direct DC fed three-phase inverters and single-phase inverters with or without a front-end converter. The power conversion circuitry may alternatively be a direct current, DC, to DC converter.

References to circuit elements (e.g. terminals, nodes, capacitors, switching circuitry) being connected along a current path may be taken to mean the circuit elements are directly connected to the current path. For example, the circuit element may be understood to be directly coupled to the current path such that current flows through the circuit element as current flows along the respective current path.

Optionally, the monitoring circuitry may further comprise first and second current sensors connectable to third and fourth terminals of the power conversion circuitry, respectively, wherein the third and fourth terminals provide external connections to third and fourth nodes connected along respective current paths each connected to a capacitor of the power conversion circuitry enclosed within the packaging, the first and second current sensors configured to generate sensed current signals for indicating currents flowing through the respective third and fourth nodes, wherein the processing circuitry may be connected to an output of the comparator and the first and second current sensors, configured to generate a capacitor current signal, indicating a capacitor current flowing through the capacitor, based on the detected switch state and the sensed current signals, and configured to monitor a condition of the capacitor based on the generated capacitor current signal.

The current sensors may be configured to sense (or measure) currents flowing through the power conversion circuitry while the power conversion circuitry is performing power conversion. The current sensors may continuously sense currents in order that a current signal may be generated. The current sensors may additionally or alternatively sense magnitudes of current at predetermined intermittent times.

The first current sensor may be directly connected to the third terminal of the power conversion circuitry.

The second current sensor may be directly connected to the fourth terminal of the power conversion circuitry.

The sensed current signals may represent alternating currents, ACs, flowing through the third and fourth nodes.

The third and fourth nodes may be connected along respective current paths on opposite sides of the capacitor.

The capacitor current signal may be generated by combining the sensed current signals and the detected switch state.

Monitoring the condition of the capacitor may comprise monitoring the health, degradation and/or remaining life span of the capacitor.

The capacitor may be connected to the switching circuitry of the power conversion circuitry enclosed within the packaging.

The capacitor may be an aluminium electrolytic capacitor, a ceralink capacitors, or a film capacitor. Further, the capacitor may comprise plural capacitors of a capacitor bank.

Optionally, wherein the terminals of the power conversion circuitry may provide the only external interface to the power conversion circuitry enclosed within the packaging.

That is, the only means by which circuit elements (e.g. nodes, switching circuitry, capacitor etc.) of the power conversion circuitry may be probed, measured and/or observed may be via the terminals providing external connections.

Optionally, the monitoring circuitry may further comprise a first current path connectable to the second terminal of the power conversion circuitry and connected to first and second voltage sources; a second current path connectable to the first terminal of the power conversion circuitry and connected to the first input terminal of the comparator and the first current path; voltage divider circuitry connected along the first and second current paths; and a unidirectional diode connected along the second current path, the unidirectional diode configured to block current from flowing towards the first terminal of the comparator along the second current path, wherein: the voltage divider circuitry and the unidirectional diode are configured to generate a voltage at the first input terminal of the comparator based on voltages generated by the switching circuitry at the first and second terminals of the power conversion circuitry.

The first voltage source may be a positive voltage source and the second voltage source may be a ground terminal (e.g. configured to generate 0V). Alternatively, the first voltage source may be a ground terminal and the second voltage source may be a positive voltage source.

The first current path may be connected to the first and second terminals of the power conversion circuitry.

The first and second current paths may by connected by a voltage node of the voltage divider circuitry.

The voltage divider circuitry may be circuitry configured to reduce a voltage generated at the first and/or second voltage sources.

The voltage divider circuitry may be configured to generate a reduced voltage at the voltage node.

The unidirectional diode may be configured to allow current to flow along the second current path in a single direction.

The unidirectional diode may be connected between the first terminal of the power conversion circuitry and the voltage divider circuitry.

The comparator may be connected to the first and second voltage sources.

Optionally, the comparator may be configured to detect a low switch state of the switching circuitry when a voltage generated at the first input terminal of the comparator is less than a voltage generated at the second input terminal of the comparator, and the comparator may be configured to detect a high switch state of the switching circuitry when a voltage generated at the first input terminal of the comparator is greater than a voltage generated at the second input terminal of the comparator.

A low switch state may indicate that the switching circuitry (e.g. a transistor) is closed (i.e. the transistor in on).

A high switch state may indicate that the switching circuitry (e.g. a transistor) is open (i.e. the transistor is off).

The comparator may be configured to output a digital signal having a binary value of one to indicate the high switch state and a binary value of zero to indicate the low switch state, or vice versa.

Optionally, the voltage divider circuitry may comprise a voltage node connected along the first and second current paths, a first impedance connected along the first current path between the voltage node and the first voltage source, and a second impedance connected along the first current path between the voltage node and the second voltage source.

Optionally, the monitoring circuitry is connected to the power conversion circuitry, wherein the unidirectional diode may be connected to the first terminal of the power conversion circuitry, the other unidirectional diode may be connected to the second terminal of the power conversion circuitry, the first current sensor may be connected to the third terminal of the power conversion circuitry, and the second current sensor may be connected to the fourth terminal of the power conversion circuitry, and wherein optionally, the second terminal and the fourth terminal are the same terminal of the power conversion circuitry.

The second terminal and the fourth terminal may be the same terminal of the power conversion circuitry. The first input terminal of the comparator and the second current sensor may be connectable (or directly connected) to the same terminal.

Optionally, the second impedance may be a Zener diode configured to block current from flowing towards the second voltage source along the first current path only when a voltage across the Zener diode is greater than a predetermined voltage.

The Zener diode may be a bidirectional diode.

The Zener diode may be configured to allow current to flow towards the second voltage source along the first current path (i.e. in a reverse-bias configuration) when the voltage across the Zener diode is less than or equal to a predetermined Zener voltage (i.e. a Zener voltage).

The predetermined Zener voltage may be, for example, −3.4 volts.

Optionally, the voltage divider circuitry may comprise another unidirectional diode connected along the first current path between the Zener diode and the second voltage source, and wherein the other unidirectional diode may be configured to block current from flowing towards the first terminal of the comparator along the first current path.

The other unidirectional diode may be the same type of diode as the unidirectional diode connected along the second current path.

The other unidirectional diode may be configured to allow current to flow along the first current path in a single direction.

Optionally, the monitoring circuitry may further comprise a third current path connected to the first and second voltage sources in parallel with the first current path, second voltage divider circuitry connected along the third current path and connected to the second input terminal of the comparator, wherein the second voltage divider circuitry is configured to generate the reference voltage at the second input terminal of the comparator.

The second voltage divider circuitry may comprise a second voltage node connected along the third current path, a third impedance connected along the third current path between the second voltage node and the first voltage source, and a fourth impedance connected along the third current path between the second voltage node and the second voltage source.

The second input terminal of the comparator may be connected to the second voltage divider circuitry at the second voltage node.

Optionally, the second voltage divider circuitry may comprise a variable impedance, and the second voltage divider circuitry may be configured to vary the voltage generated at the second input terminal of the comparator by varying the variable impedance.

The variable impedance may be, for example, a variable resistor or a variable capacitor.

Optionally, the first current sensor may be configured to generate an input current signal for indicating an input current flowing through the third node positioned along an input current path of the power conversion circuitry, the second current sensor may be configured to generate an output current signal for indicating an output current flowing through the fourth node positioned along an output current path of the power conversion circuitry, and the processing circuitry may be configured to generate the capacitor current signal based on the detected switch state, the input current signal and the output current signal.

The input current signals may represent an alternating current, AC, flowing through the third node.

The output current signal may represent an AC flowing through the fourth node.

The input current may be a power conversion circuitry input current or a capacitor input current.

The output current may be a power conversion circuitry output current or a capacitor output current.

The capacitor current signal may be generated by combining the input current signal, the output current signal and the detected switch state.

Optionally, the monitoring circuitry may further comprise isolation circuitry connected between the processing circuitry and the output of the comparator.

The isolation circuitry may be configured to provide electrical isolation between the comparator and the processing circuitry.

Optionally, the isolation circuitry may comprise an optocoupler, a pulse transformer, or a capacitive isolator.

Optionally, the monitoring circuitry may further comprise AC filter circuitry connectable to at least one terminal of the power conversion circuitry, the AC filter circuitry may be configured to detect a capacitor voltage signal of the capacitor, and wherein the processing circuitry may be configured to determine a capacitor impedance of the capacitor based on an amplitude of the generated capacitor current signal and an amplitude of the detected capacitor voltage signal.

The generated capacitor current signal and the detected capacitor voltage signal may be AC signals.

The AC filter circuitry may comprise one or more capacitors, resistors and/or inductors.

The AC filter circuitry may be configured to filter a predetermined range of capacitor voltage frequencies (e.g. to identify voltage ripple).

The AC filter circuitry may be connectable to fifth and sixth terminals of the power conversion circuitry, wherein the fifth and sixth terminals provide external connections to first and second capacitor terminals connected along a current path of the power conversion circuitry. The fifth and sixth terminals may be DC bus terminals of the power conversion circuitry.

The capacitor impedance may be determined by dividing the amplitude of the generated capacitor current by the amplitude of the detected capacitor voltage signal.

An amplitude may be taken to be a magnitude of the respective signal.

Optionally, the processing circuitry may be configured to determine a capacitance of the capacitor and/or an equivalent series resistance, ESR, of the capacitor based on the determined capacitor impedance.

The capacitance of the capacitor may be determined by multiplying the capacitor impedance by the phase difference between the generated capacitor current signal and the detected capacitor voltage signal (i.e. $\sin(\text{theta})/\sin(\theta)$).

The ESR of the capacitor may be determined by multiplying the capacitor impedance by the phase difference between the generated capacitor current signal and the detected capacitor voltage signal (i.e. $\cos(\text{theta})/\cos(\theta)$).

Optionally, the monitoring circuitry may further comprise a temperature sensor configured to measure an ambient temperature of the power conversion circuitry, and wherein the processing circuitry may be configured to determine a core temperature of the capacitor based on the determined capacitor impedance and the measured ambient temperature.

The ambient temperature may be a temperature external to the power conversion circuitry (e.g. a temperature at the external surface of the packaging).

The core temperature of the capacitor may be determined by multiplying the measured ambient temperature by the capacitor impedance.

The core temperature of the capacitor may be a temperature between first and second terminals of the capacitor.

Optionally, the monitoring circuitry may further comprise clock circuitry, the clock circuitry may be configured to determine when the power conversion circuitry is inactive for greater than or equal to a predetermined duration, and wherein the temperature sensor may be configured to determine a reference core temperature of the capacitor when the power conversion circuitry is determined to be inactive for greater than or equal to the predetermined duration, and the processing circuitry may be configured to calibrate core temperature estimation performed by the monitoring circuitry based on the determined impedance of the capacitor and the determined reference core temperature.

Advantageously, no external calibration may be required because the monitoring circuitry self-calibrates for ageing related changes to temperature sensitive electrical parameters (TSEP) using measured off-times and ambient temperature.

The clock circuitry may be battery powered.

The clock circuitry may comprise quartz crystal oscillator circuitry.

The clock circuitry may be part of the processing circuitry.

The reference core temperature of the capacitor may be a core temperature of the capacitor taken when the power conversion circuitry temperature is at a predetermined temperature (e.g. a temperature within 1 or 2 degrees of the measured ambient temperature).

The predetermined duration may be a duration after which the power conversion circuitry is at the predetermined temperature (e.g. 1 second, 1 minute or 5 minutes, for example).

Inactive may be taken to mean that the power conversion circuitry is not performing power conversion.

According to a second aspect there is provided a method of monitoring power conversion circuitry enclosed within packaging, the power conversion circuitry comprising terminals providing external connections to nodes of the power conversion circuitry enclosed within the packaging, the method comprising detecting a switch state of switching circuitry of the power conversion circuitry enclosed within the packaging, and monitoring the power conversion circuitry based on the detected switch state and a signal of the power conversion circuitry.

According to a third aspect, there is provided a computer-readable medium comprising instructions which, when executed on a computer of monitoring circuitry, cause the computer to perform the method of the second aspect.

According to a fourth aspect, there is provided monitoring circuitry comprising a first current path connectable to a second terminal of power conversion circuitry and connected to first and second voltage sources a second current path connectable to a first terminal of the power conversion circuitry and connected to a first input terminal of a comparator and the first current path; voltage divider circuitry connected along the first and second current paths; and a unidirectional diode connected along the second current path, the unidirectional diode configured to block current from flowing towards the first input terminal of the comparator along the second current path, wherein the voltage divider circuitry and the unidirectional diode are configured to generate a voltage at the first input terminal of the comparator based on voltages generated by the switching circuitry at first and second terminals of the power conversion circuitry.

The monitoring circuitry of the fourth aspect may comprise one or more of the features described above in relation to the monitoring circuitry of the first aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DISCLOSURE OF THE DESCRIPTION

Aspects and embodiments of the present disclosure will now be discussed with reference to the accompanying figures. Further aspects and embodiments will be apparent to those skilled in the art.

FIG. 1

Figure 1:
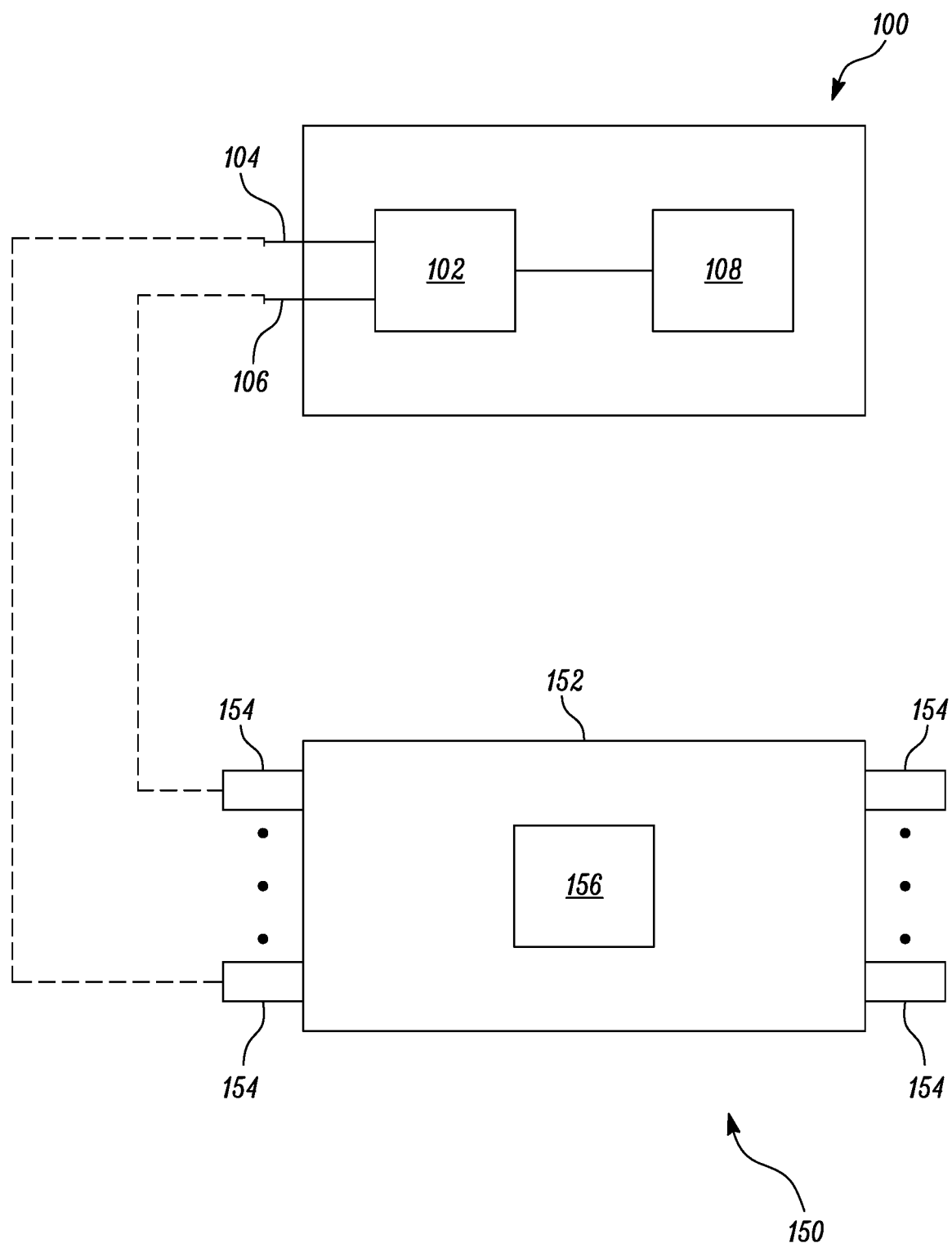
FIG. 1 is a schematic diagram of monitoring circuitry and power conversion circuitry.

Exemplary monitoring circuitry 100 configured to monitor power conversion circuitry 150 is shown in FIG. 1. The monitoring circuitry may monitor the general operation of the power conversion circuitry 150 and/or conditions of specific component(s) of the power conversion circuitry (e.g. a capacitor).

The monitoring circuitry 100 is configured to be connected to and disconnected from the power conversion circuitry 150 enclosed within packaging 152. For ease of explanation, the following description will describe the monitoring circuitry 100 as being connected to the power conversion circuitry 150. The dashed lines between the monitoring circuitry 100 and the power conversion circuitry 150 of FIG. 1 illustrate how the monitoring circuitry 100 may be connectable to the power conversion circuitry 150.

The power conversion circuitry 150 may be COTS power conversion circuitry 150 which has been packaged during manufacture. Example types of power conversion circuitry include front-end (active or passive) rectifier fed three-phase two-level converters (e.g. used as AC drives), direct DC fed three-phase inverters, single-phase inverters with or without a front-end converter, and DC to DC converters.

The packaging 152 may be metal or rigid plastic packaging providing a housing for the power conversion circuitry. The packaging 152 may be configured to protect the power conversion circuitry from damage by preventing interference with electronic components of the power conversion circuitry.

Referring to FIG. 1, the power conversion circuitry 150 comprises terminals 154 which provide external connections to nodes (not shown) of the power conversion circuitry 150 enclosed within the packaging 152. The terminals 154 may provide the only external interface to the power conversion circuitry 150. That is, the terminals 154 may provide the only means by which components of the power conversion circuitry 150 may be probed/monitored/measured/observed by an external device (i.e. on the external surface of the packaging 152) without interfering with the packaging 152 or modifying the power conversion circuitry itself. The dashed lines between the terminals 154 of FIG. 1 illustrate that the power conversion circuitry 150 may include any number of terminals.

The power conversion circuitry further comprises switching circuitry 156 having nodes connected to respective terminals 154.

Each terminal of the power conversion circuitry 150 may be connected to a node at one end and project though the packaging 152 to connect to an external device at the other end. The terminals may thereby provide a means for an external device to connect to nodes of the power conversion circuitry 150, which are enclosed within the packaging, without interfering with the packaging 152 or the components of the power conversion circuitry 150.

The nodes of the power conversion circuitry may be nodes connected along respective current paths of the power conversion circuitry 150 through which current flows when the power conversion circuitry 150 is operating (i.e. converting power/current/voltage).

The monitoring circuitry 100 comprises a comparator 102 comprising a first input terminal 104 connectable to first and second terminals 154 of the power conversion circuitry and a second input terminal 106 connected to a reference voltage. When the monitoring circuitry 100 is connected to the power conversion circuitry 150, the first input terminal 104 of the comparator 102 is directly connected to the first and second terminals 154 of the power conversion circuitry 150. The first and second terminals 154 provide external connections to first and second nodes connected along respective current paths of the power conversion circuitry 150 (not shown). The respective current paths of the first and second nodes are connected to the switching circuitry 156 of the power conversion circuitry 150 which is also enclosed within the packaging 152.

The first and second nodes may be connected along respective current paths on opposite sides of the switching circuitry 156 such that a voltage across the switching circuitry 156 may be detected at the first input terminal of the comparator.

The comparator 102 may generate an output signal indicating a switch state of the switching circuitry 156 based on voltages generated at the first and second terminals 154 of the power conversion circuitry 150 and the reference voltage. The voltages generated at the first and second terminals 154 of the power conversion circuitry 150 may vary depending on the switch state of a switch or switches (e.g. transistors) of the switching circuitry 156.

The output signal generated by the comparator 102 may be a digital signal indicating whether the switch state of the switching circuitry is high or low. For example, if one or more switches of the switching circuitry 156 are open, the voltage generated at the first input terminal 104 may be relatively high compared to the reference voltage.

In this case, the comparator 102 may output a digital output signal having a high binary value (i.e. one, represented by 5 volts).

Conversely, if the switch or switches are (all) closed, the voltage generated at the first input terminal 104 may be relatively low compared to the reference voltage. In this case, the comparator 102 may output a digital output signal having a low binary value (i.e. zero, represented by 0 volts).

It will be understood that the above configuration may be inverted such that the comparator outputs a high binary value when the switch or switches are closed and outputs a low binary value when at least one the switch is open.

The monitoring circuitry 100 further comprises processing circuitry 108 (e.g. a microprocessor or a FPGA) connected to the comparator 102.

The processing circuitry 108 may be connected to the comparator 102 such that the switch state (e.g. output signal/digital signal) determined by the comparator is received by the processing circuitry 108.

The processing circuitry 108 may process received information in order to monitor the power conversion circuitry 150. That is, the processing circuitry 108 is configured to monitor the power conversion circuitry 150 based on the switch state detected by the comparator 102 and based on a signal (e.g. a current signal or a voltage signal) of the power conversion circuitry 150.

The processing circuitry 108 may determine a condition of the power conversion circuitry 150 based on the processing.

Processing may be performed continuously by the processing circuitry 108 as information (i.e. signal information and switch state information) is received and/or intermittently by saving information in a memory and subsequently processing information saved in the memory.

The monitoring circuitry 100 will now be described in more detail below with reference to FIG. 2.

FIG. 2

Figure 2:
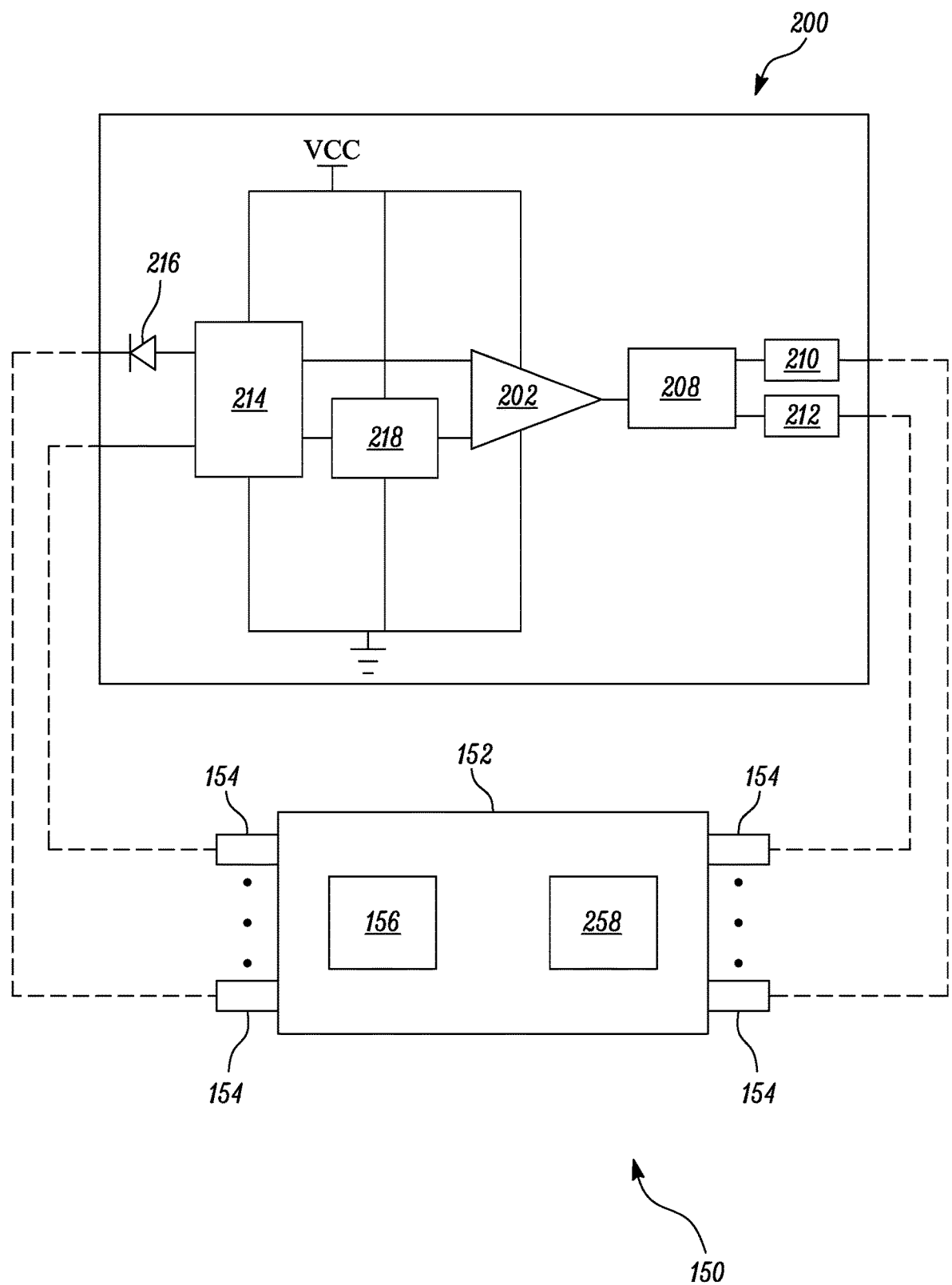
FIG. 2 is another schematic diagram of monitoring circuitry and power conversion circuitry.

Referring to FIG. 2, the monitoring circuitry 200 comprises a comparator 202 comprising a first input terminal 204 connectable to the first and second terminals 154 of the power conversion circuitry and a second input terminal 206 connected to a reference voltage. The monitoring circuitry further comprises processing circuitry 208 connected to the comparator 202.

The comparator 202 and the processing circuitry 208 of the monitoring circuitry 200 have at least the same functionality as the comparator 202 and the processing circuitry 108 discussed above in relation to the monitoring circuitry 100 of FIG. 1. Therefore, the description of these functionalities will not be repeated for brevity.

The monitoring circuitry 100 may further comprise first and second current sensors 210, 212 connectable to third and fourth terminals 154 of the power conversion circuitry 150, respectively. The current sensors 210, 212 are configured to be connected to and disconnected from the power conversion circuitry 150 enclosed within packaging 152. For ease of explanation, the following description will describe the current sensors 210, 212 as being connected to the power conversion circuitry 150. For example, the first current sensor 210 may be directly connected to the third terminal of the power conversion circuitry 150 and/or the second current sensor 212 may be directly connected to the fourth terminal of the power conversion circuitry 150.

The dashed lines between the monitoring circuitry 200 and the power conversion circuitry 150 of FIG. 2 illustrate how the monitoring circuitry 200 may be connectable to the power conversion circuitry 150.

The third and fourth terminals provide external connections to third and fourth nodes connected along respective current paths. The respective current paths of the third and fourth nodes may be connected to a capacitor 258 of the power conversion circuitry 150 enclosed within the packaging 152.

The capacitor 258 may be connected to the switching circuitry 156 within the packaging 152. The capacitor 258 may, for example, be configured to filter switching ripple introduced to a signal by the switching circuitry 156. The capacitor 258 may be an aluminium electrolytic capacitor, a ceralink capacitor a film capacitor or a capacitor bank.

The current sensors 210, 212 may be configured to sense (or measure) currents flowing through the power conversion circuitry 150 while the power conversion circuitry 150 is performing power conversion. For example, the third and fourth nodes may be connected along respective current paths on opposite sides of the capacitor 258 such that the first current sensor senses an input current and the second current sensor senses an output current. The input current may be a current input to the power conversion circuitry 150 or a current input to the capacitor 258. The output current may be a current output from the power conversion circuitry or a current output from the capacitor 256.

The current sensors 210, 212 may be configured to perform continuous and/or intermittent sensing of currents. For example, the current sensors 210, 212 may continuously or intermittently sense capacitor input and output currents for use in monitoring the capacitor. The current sensors 210, 212 may additionally or alternatively sense magnitudes of capacitor input and output currents at predetermined intermittent times for use in monitoring the capacitor 258.

Upon sensing respective currents, the current sensors 210, 212 may generate sensed current signals which represent currents flowing through the respective third and fourth nodes (e.g. the input current and the output current). That is, the current sensors 210, 212 may generate an input current signal indicating an input current flowing through the third node positioned along an input current path of the power conversion circuitry 150 and an output current signal indicating an output current flowing through the fourth node positioned along an output current path of the power conversion circuitry 150. The sensed current signals may be subsequently used in monitoring the capacitor 258.

The sensed current signals may be generated as AC or DC current signal depending on the type of power conversion circuitry 150 being monitored.

In order for the monitoring circuitry 100 to detect the switch state of the switching circuitry 156, voltage control circuitry may be provided at the first and second input terminals 204, 206 of the comparator 202 in order to generate required voltages at the first and second input terminals 204, 206.

The voltage control circuitry may comprise first, second and third current paths connected between first and second voltage sources (e.g. positive and negative voltage source or a positive voltage source (e.g. VCC) and a ground terminal). A voltage may be generated at the first input terminal 204 based on an arrangement of components along the first and second current paths and a voltage may be generated at the second input terminal 206 based on an arrangement of components along the third current path, as discussed in detail below.

The first current path may comprise voltage divider circuitry 214 (referred to from hereon as first voltage divider circuitry 214). The first voltage divider circuitry 214 may be connected to the first input terminal 204 of the comparator 202 via the second current path. That is, the first voltage divider circuitry 214 may be connected to both the first and second current paths (e.g. at a voltage node of the voltage divider circuitry 214).

The comparator 202 may be connected between the first and second voltage sources such that the output of the comparator 202 is proportional to the first or second voltage source depending on a result of the comparison of voltages at the first and second input terminals 204, 206.

The second current path may comprise the first voltage divider circuitry 214 and a diode 216 (i.e. a unidirectional diode). When the monitoring circuitry 100 is connected to the power conversion circuitry 150, a cathode of the diode 216 is connected to the first terminal 154 of the power conversion circuitry 150 and an anode of the diode 216 is connected to the first voltage divider circuitry 214. The second current path may therefore comprise the diode 216 and the first voltage divider circuitry 214 connected between the first terminal of the power conversion circuitry 150 and the first input terminal 204 of the comparator 202.

When the monitoring circuitry 100 is connected to the power conversion circuitry 150, the first voltage divider circuitry 214 is connected to the second terminal 154 of the power conversion circuitry 150 via the first current path.

In some examples, the first voltage divider circuitry 214 comprises first and second impedances (not shown) connected is series between the first and second voltage sources. The first and second current paths may be connected to a voltage node (referred to from hereon as first voltage node) between the first and second impedances. The first input terminal 204 may be connected to the first voltage divider circuitry 214 at the first voltage node. When the monitoring circuitry 100 is connected to the power conversion circuitry 150, the second impedance is connected to the second terminal 154 of the power conversion circuitry 150.

The first voltage divider circuitry 214 may be configured to reduce (i.e. divide) a voltage generated by the first voltage source at the first voltage node (e.g. by means of a potential divider).

The above discussed diode 216 and first voltage divider circuitry 214 provide a means for generating a voltage at the first input terminal 204 based on voltages generated and the first and second terminals 154 of the power conversion circuitry 150. For example, when a voltage generated at the first and second terminals 154 is greater than a voltage generated by the first voltage divider circuitry 214 (e.g. at the first voltage node), the diode 216 enters a reverse bias configuration thereby preventing current from flowing along the second current path from the power conversion circuitry 150 to the first voltage divider circuitry 214. In such a case, the voltage at the first input terminal 204 may be proportional to a voltage generated by the voltage divider circuitry 214 (e.g. at the first voltage node). Conversely, when a voltage generated at the first and second terminals 154 is less that a voltage generated by the first voltage divider circuitry 214, the diode 216 enters a forward bias configuration thereby allowing current to flow from the first voltage divider circuitry 214 to the power conversion circuitry 150. In such a case, the voltage at the first input terminal 204 may be proportional to a voltage generated across the diode 216 and the first and second terminals 154 only.

In some examples the second impedance may be a Zener diode with the cathode of the Zener diode being connected to the first voltage node and the anode of the Zener diode being connected to the second terminal 154 and the second voltage source. The Zener diode may be configured to allow current to flow along the first current path in both directions under certain conditions. That is, when a voltage generated at the second terminal 154 (to which the Zener diode is connected) is greater than a voltage generated at the first voltage node, the Zener diode enters a forward bias configuration in which current is allowed to flow from the second terminal 154 to the first voltage source. When a voltage generated at the second terminal 154 is less than a voltage generated at the first voltage node, the Zener diode enters a reverse bias configuration in which current is only allowed to flow from the first voltage node to the second terminal 154 when a reverse voltage across the Zener diode is equal to or greater than a Zener voltage (e.g. −3.4V).

In examples where the second impedance is the Zener diode, the Zener voltage may be such that, when a voltage generated at the first and second terminals 154 is less that a voltage generated at the first voltage node, the diode 215 enters forward bias configuration and the Zener diode blocks current from flowing towards the second voltage source and the second terminal 154. The Zener diode therefore ensures the voltage at the first input terminal 204 is only proportional to a voltage generated across the diode 216 and the first and second terminals 154 when a voltage generated at the first and second terminals 154 is less than a voltage generated at the first voltage node of the first voltage divider circuitry 214.

It will be understood from the above discussed arrangement that a voltage generated at the first input terminal 204 is proportional to a voltage generated at the first voltage divider circuitry (e.g. at the first voltage node) when switch(es) of the switching circuitry 156 is/are (all) closed (i.e. the voltage generated at the first and second terminals 154 is less than the voltage generated by the first voltage divider circuitry). Furthermore, it will be understood that a voltage generated at the first input terminal 204 is proportional to a voltage generated across the diode 216 and the first and second terminals 154 only when at least one switch of the switching circuitry 156 is open (i.e. the voltage generated at the first and second terminals 154 is greater than the voltage generated by the first voltage divider circuitry 214).

The third current path may be connected between the first and second voltage sources in parallel to the first current path. Second voltage divider circuitry 218 may be connected along the third current path such that a reduced (i.e. divided) voltage is generated at a second voltage node based on a voltage generated at the first voltage source. This reduced voltage may be referred to as a reference voltage of the comparator 202. The second input terminal 206 of the comparator 202 may be connected to the third current path at the second voltage node such that the second voltage divider circuitry 218 controls the reference voltage generated at the second input terminal 206.

In some examples, the second voltage divider circuitry 218 comprises a third impedance (not shown) connected along the third current path between the second voltage node and the first voltage source and a fourth impedance (not shown) connected along the third current path between the second voltage node and the second voltage source.

The third and second impedances may form potential divider circuitry such that the reference voltage is generated at the second voltage node based on a voltage generated at the first voltage source.

The third and/or the fourth impedance may be variable impedance(s), such as a variable resistor or a variable capacitor. The reference voltage generated at the second input terminal 206 (i.e. the second voltage node) may be controlled by varying the variable impedance.

The reference voltage may by selected based on a voltage rating of the switching circuitry 156.

By generating voltages at the first and second input terminals 204, 206, as discussed above, the comparator 202 may be configured to detect a low switch state of the switching circuitry (i.e. indicating that switch(es) of the switching circuitry is/are closed) and a high switch state of the switching circuitry (i.e. indicating that switch(es) of the switching circuitry is/are open).

The comparator 202 may be configured to detect a low switch state of the switching circuitry 156 when a voltage generated at the first input terminal 204 of the comparator 202 (i.e. by the first voltage divider circuitry 214) is less than a voltage generated at the second input terminal 206 of the comparator 102 (i.e. by the second voltage divider circuitry 218). Further, the comparator 202 may be configured to detect a high switch state of the switching circuitry 156 when a voltage generated at the first input terminal 204 of the comparator 202 is greater than a voltage generated at the second input terminal 206 of the comparator 202.

Upon detecting a high or low switch state of the switching circuitry 156, the comparator 202 may output a digital signal (i.e. output signal) having a binary value. A digital signal having a binary value of one (with a voltage proportional to a voltage generated by the first voltage source) may indicate a high switch state of the switching circuitry 156. A digital signal having a binary value of zero (with a voltage proportional to a voltage generated by the second voltage source) may indicate a low switch state of the switching circuitry 156.

Alternatively, a digital signal having a binary value of zero may indicate a high switch state of the switching circuitry 156 and a digital signal having a binary value of one may indicate a low switch state of the switching circuitry 156.

In some examples, the first voltage divider circuitry 214 may comprise another diode (not shown) connected along the first current path between the Zener diode and the second voltage source. The cathode of the other diode may be connected to the second terminal 154 and the anode of the other diode may be connected to the cathode of the Zener diode such that the other diode is configured to block current from flowing towards the first terminal 204 of the comparator 202 along the first current path. The other diode may be the same type of diode as the diode 216 connected to the first voltage divider circuitry 214.

The monitoring circuitry 100 may further comprise isolation circuitry (not shown) connected between the processing circuitry 208 and the output of the comparator 202 in order to provide electrical isolation between the comparator 202 and the processing circuitry 208. The isolation circuitry may comprise an optocoupler, a pulse transformer, or a capacitive isolator configured to wirelessly transmit the digital signal output from the comparator 202 (which indicates the switch state) to the processing circuitry 208 for processing.

In addition to generating a capacitor current signal, it may be desirable to also acquire a capacitor voltage signal for use in monitoring the capacitor 258. Therefore, the monitoring circuitry may further comprise AC filter circuitry (not shown) comprising, for example, one or more resistors, capacitors and/or inductors.

The AC filter circuitry may be connectable to at least one terminal of the power conversion circuitry. For example, the AC filter circuitry may be connected to fifth and sixth terminals of the power conversion circuitry 150, wherein the fifth and sixth terminals provide external connections to first and second capacitor terminals connected along a current path of the power conversion circuitry 150. In examples where AC filter circuitry acquires an AC capacitor voltage signal, the processing circuitry is configured to generate an AC capacitor current signal.

The AC filter circuitry may be configured to detect an AC capacitor voltage signal of the capacitor 258 based on voltages generated at the fifth and sixth terminals (e.g. DC bus terminals). In some examples the AC filter circuitry may filter a predetermined range of capacitor voltage frequencies according to certain frequencies required for monitoring (e.g. in order to monitor voltage ripple).

In addition to generating a capacitor current signal and detecting a capacitor voltage signal, it may be desirable to also determine a core temperature of the capacitor 258 (e.g. a temperature between first and second terminals of the capacitor 258) for use in monitoring the capacitor 258. Therefore, the monitoring circuitry may further comprise a temperature sensor (not shown) configured to measure an ambient temperature of the power conversion circuitry 150 (e.g. the atmospheric temperature adjacent to the external surface of the packaging 152). The ambient temperature may be processed by the processing circuitry 208 to determine a core temperature of the capacitor, as discussed in more detail below.

In some examples, the monitoring circuitry 100 may be configured to perform self-calibration of core temperature determination. In such examples, the monitoring circuitry 100 may comprise clock circuitry (not shown) configured to determine when the power conversion circuitry 150 has been inactive for greater than or equal to a predetermined duration. That is, the clock circuitry determines if the power conversion circuitry 150 has not performed power conversion for a predetermined duration (e.g. 1 second, 1 minute or 5 minutes). Upon determining that the power conversion circuitry has been inactive for a predetermined duration, the temperature sensor may be configured to determine a reference core temperature of the capacitor 258 when the power conversion circuitry 150 is determined to be inactive for greater than or equal to the predetermined duration. The reference core temperature may be processed by the processing circuitry 208 to perform self-calibration, as discussed in more detail below.

The reference core temperature of the capacitor 258 may be a core temperature of the capacitor taken when the power conversion circuitry temperature is at a predetermined temperature (e.g. a temperature within 1 or 2 decrees of the measured ambient temperature).

The above discussed example arrangements of components of the monitoring circuitry 100 may enable the processing circuitry 208 to perform monitoring, as follows:

The processing circuitry 208 may be connected to an output of the comparator 202 (e.g. a comparator output terminal) and the first and second current sensors 210, 212. Such connections provide a means for the processing circuitry 208 to receive sensed current signals from the current sensors 210, 212 and a switch state from the comparator 202.

In order to perform monitoring of the capacitor 258 condition, the processing circuitry 208 may generate a capacitor current signal based on the received switch state and the received (input and output) sensed current signals (e.g. by performing mesh current analysis). The generated capacitor current signal may represent a capacitor current flowing through the capacitor.

The generated current signal may be used to determine a capacitor impedance of the capacitor 258 for use in the monitoring. The capacitor impedance may be determined based on an amplitude (e.g. a magnitude) of the generated capacitor current signal and an amplitude (e.g. a magnitude) of the detected capacitor voltage signal (for example, by dividing the amplitude of the generated capacitor current by the amplitude of the detected capacitor voltage signal).

The capacitor impedance may subsequently be used by the processing circuitry 208 to determine a capacitance of the capacitor 258 and/or an ESR of the capacitor 258 based on the determined capacitor impedance. For example, the capacitance of the capacitor may be determined by multiplying the capacitor impedance by sin(theta) and the ESR of the capacitor may be determined by multiplying the capacitor impedance by cos(theta), where "theta" is the phase difference between the generated capacitor current signal and the detected capacitor voltage signal.

As discussed above, another metric which may be desirable for use in the monitoring is core temperature of the capacitor. The processing circuitry 208 may be configured to determine a core temperature of the capacitor 258 based on the determined capacitor impedance and the measured ambient temperature. For example, the core temperature may be determined by multiplying the measured ambient temperature by the capacitor impedance.

The self-calibration of core temperature determination, as discussed above, may be performed by the processing circuitry 208 based on the determined impedance (e.g. low frequency impedance) of the capacitor and the determined reference core temperature, for example as: $T=f(Z,Z0)$, where T is operating temperature, Z is capacitor impedance at temperature T, and Z0 is a known value of capacitor impedance previously measured at a known temperature T0.

When a capacitor ages, the relationship between capacitor impedance measured at low frequencies (<few hundred Hz) and temperature shifts. This shift can be estimated with values for known impedance Z0 aged at temperature T0 (e.g. ambient temperature).

Values of Z0 and T0 may be obtained during the period in which the power conversion circuitry 150 is determined to be inactive for greater than or equal to a predetermined duration (i.e. when the capacitor has cooled down). These values of T0 and Z0 aged may be used to correct the relationship shift. New values of T0 and Z0 may be obtained periodically/intermittently in order to continuously self-calibrate.

Monitoring the condition of the capacitor 258 may comprise monitoring the health status of the capacitor 258, monitoring the degradation of the capacitor 258 and/or determining the remaining life span of the capacitor 258 based on the generated capacitor current signal, the detected capacitor voltage signal, the determined capacitor impedance, the determined capacitance, the determined ESR, and/or the determined core temperature of the capacitor.

The knowledge of the capacitor's condition may be used to control a degradation rate by modifying mission profile data. This can be further extended and incorporated into predictive maintenance and scheduling of the power conversion circuitry 150.

FIG. 3

Figure 3:
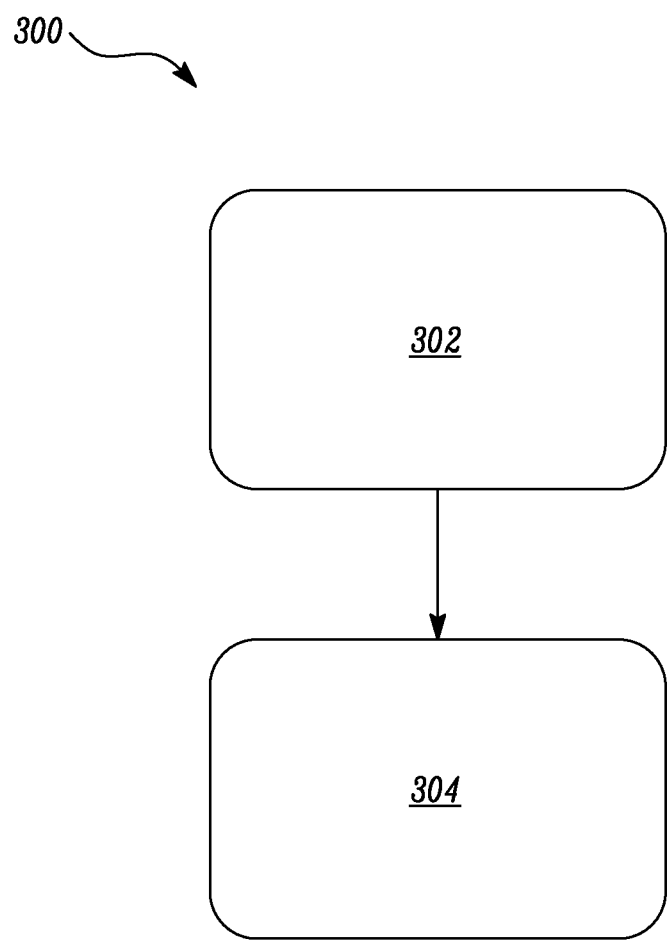
FIG. 3 is a schematic representation of a method of monitoring power conversion circuitry.

An exemplary method 300 of monitoring power conversion circuitry 150 is shown in FIG. 3. The monitoring method comprises:
  302 detecting a switch state of switching circuitry of the power conversion circuitry enclosed within the packaging; and
  304 monitoring the power conversion circuitry based on the detected switch state and a signal of the power conversion circuitry.

The monitoring method 300 should be understood to monitor the power conversion circuitry 150 as described above in relation to FIG. 1 and FIG. 2.

In any of the above examples, the various features may be implemented in hardware, or as software modules running on one or more processors/computers. For example, the method 300 may be implemented with a computer-readable medium comprising instructions which, when executed on a computer of power conversion circuitry, cause the computer to perform the method 300.

Examples also provide a computer program or a computer program product comprising instructions which, when executed by a computer, cause the computer to carry out any of the methods/method steps described herein, and a non-transitory computer-readable medium comprising instructions which, when executed by a computer, cause the computer to carry out any of the methods/method steps described herein. A computer program embodying the disclosure may be stored on a non-transitory computer-readable medium, or it could, for example, be in the form of a signal such as a downloadable data signal provided from an Internet website, or it could be in any other form.

FIG. 4

Figure 4:
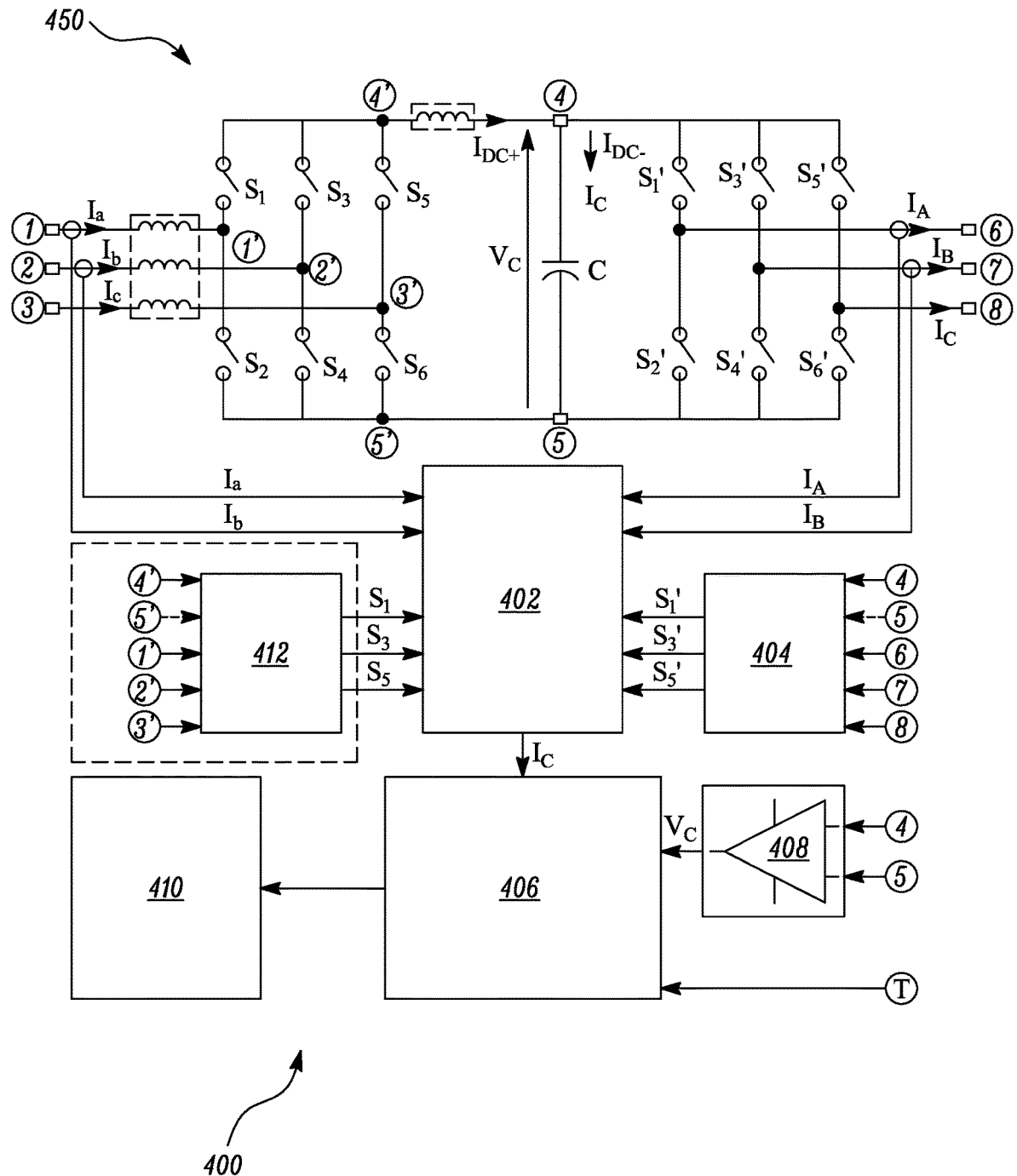
FIG. 4 is another schematic diagram of monitoring circuitry and power conversion circuitry.

In another example illustrated in FIG. 4, the power conversion circuitry 150 is a front-end (active or passive) rectifier fed three-phase two-level converter. However, it will be understood that the monitoring circuitry may alternatively be used to monitor a direct DC fed three-phase inverters, a single-phase inverters with or without a front-end converter, or a direct DC to DC converter.

Referring to FIG. 4, power conversion circuitry 450 comprises twelve switches ($S_1$, $S_2$, $S_3$, $S_4$, $S_5$, $S_6$, $S_1'$, $S_2'$, $S_3'$, $S_4'$, $S_5'$, $S_6'$). In a case where the power conversion circuitry 450 comprises a passive front-end (PFE), switches $S_1$, $S_2$, $S_3$, $S_4$, $S_5$, $S_6$ are diodes. Whereas, in a case where the power conversion circuitry 450 comprises an active front-end (AFE), switches $S_1$, $S_2$, $S_3$, $S_4$, $S_5$, $S_6$ are controllable switches such as bipolar junction transistors (BJTs), metal-oxide-semiconductor field-effect transistor (MOSFET), thyristors or insulated gate bipolar transistor (IGBT). In the examples illustrated in FIG. 4, switches $S_1'$, $S_2'$, $S_3'$, $S_4'$, $S_5'$, $S_6'$ are MOSFETs or IGBTs.

The inductors inside dashed line boxes on the left-hand side and top of the power conversion circuitry 450 in FIG. 4 are optional filters.

In the example illustrated in FIG. 4, monitoring circuitry 400 comprises a first processing circuitry 402, first switch detection circuitry 404, voltage detection circuitry 408 (i.e. AC filter circuitry), second processing circuitry 406, second switch detection circuitry 412, and a monitoring output stage 410. The monitoring circuitry 400 is configured to monitor a DC-link capacitor (C) of the power conversion circuitry 450. The capacitor may be an aluminium electrolytic capacitor, a ceralink capacitor, a film capacitor or a capacitor bank.

The power conversion circuitry 450 is COTS power conversion circuitry 450 having terminals labelled in circled numbers. Terminals 1, 2, 3, 4, 5, 6, 7 and 8 are terminals that provide external connections to nodes within the power conversion circuitry 450 for access by a user. For power conversion circuitry 450 with PFE and AFE without filters, the DC link capacitor may be monitoring by the monitoring circuitry 400 using one or more of nodes 1, 2, 3, 4, 5, 6, 7 and 8 (only). For power conversion circuitry 450 having AFE with filters, the DC link capacitor may be monitored by the monitoring circuitry using additional terminals 1', 2', 3', 4', and 5'. The switch state of $S_1$ to $S_6$ is monitored by the second switch detection circuitry 412 via additional terminals 1', 2', 3', 4', and 5' in power conversion circuitry 450 having AFE with filters.

The monitoring circuitry 400 is configured to estimate the DC link capacitor ESR, capacitance and core temperature using a detected capacitor/DC-link voltage (measured by the voltage detection circuitry 408, connected at terminals 4 and 5), and using a capacitor current reconstructed by the first processing circuitry 402 using input and output currents of the power conversion circuitry 450 (measured by at least two terminals from among terminals 1 to 8). Advantageously, the monitoring circuitry 400 determines the capacitor current in COTS power conversion circuitry 450 by extracting switching information from terminals 1 to 8 that are easily accessible to a user.

Capacitor Current Reconstruction

Capacitor current reconstruction may be implemented by the first processing circuitry 402 in any COTS power conversion circuitry 450. The capacitor reconstruction method as discussed herein reduces costs compared to high-bandwidth current sensors that are required in typical capacitor reconstruction methods.

To reconstruct the capacitor current, two out of three AC line currents are measured in both the input ($I_a$, $I_b$, $I_c$) and the output side ($I_A$, $I_B$, $I_C$) of the power conversion circuitry 450, as shown in FIG. 4. The AC currents in the third phases (e.g. $I_c$, $I_C$) can be calculated using the two measured current (e.g. ($I_a$, $I_b$ and $I_A$, $I_B$) based on the following equations (1) and (2):

For input side, $I_a + I_b + I_c = 0$ $$I_c = -(I_a + I_b) \quad (1)$$

For output side, $I_A + I_B + I_C = 0$ $$I_C = -(I_A + I_B) \quad (2)$$

As the currents measured are at line frequencies, usually 50 or 60 Hertz (Hz) for land based and marine systems, and less than a few kilo Hertz (kHz) for aerospace systems, low bandwidth current sensors with bandwidth in the range of few tenths of kHz to 100 kHz can be used. This is advantageous as capacitor current measurement in typical methods may require bandwidth in the range of mega Hertz (MHz). In order to reconstruct the capacitor current from the input and output currents, the total current flowing in ($I_{DC+}$) and out ($I_{DC-}$) of the DC-link is determined (estimated) using switch currents of the switches.

For $I_{DC-}$ estimation, switch currents may be estimated using the on/off status (i.e. switch state) of the respective switches. Switch states (SS1', SS3', SS5') of switches $S_1'$, $S_3'$ and $S_5'$ may be estimated using first switch detection circuitry 404, as illustrated in more detail in FIG. 5.

FIG. 5

Figure 5:
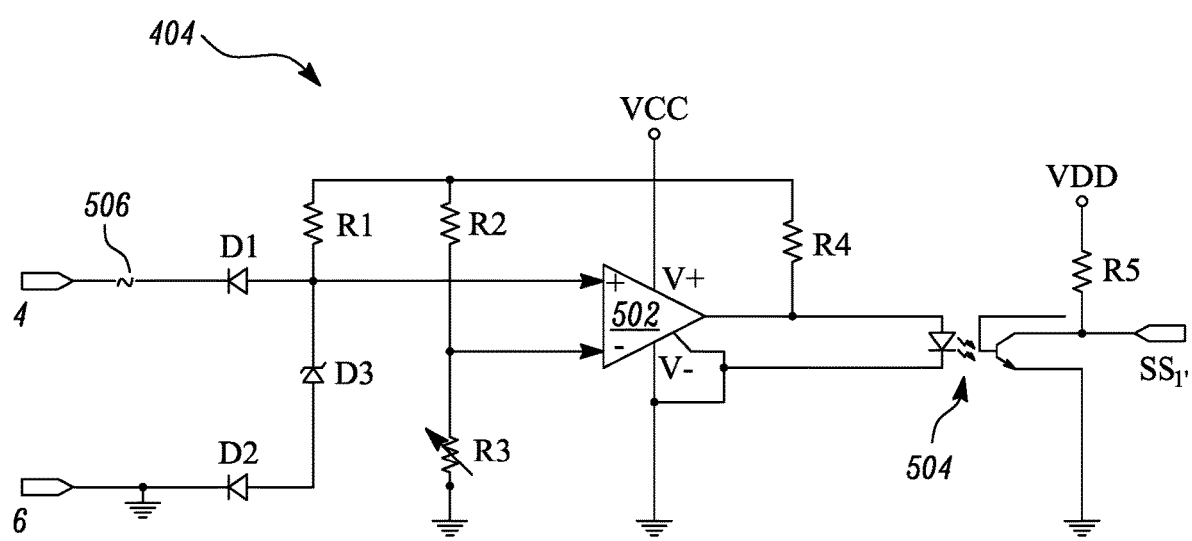
FIG. 5 is a schematic diagram of switch detection circuitry.

Referring to FIG. 5, the first switch detection circuitry 404 is connected to the power conversion circuitry 450 at terminals 4 and 6, respectively, in order to detect the switch state (SS1') of switch $S_1'$.

The first switch detection circuitry 404 comprises a comparator 502 having first and second input terminals (e.g. a non-inverting terminal and an inverting terminal, respectively) and an output terminal. The first input terminal of the comparator 502 is connected to terminals 4 and 6 via an arrangement of diodes and/or resistors, as discussed in more detail below. The comparator 502 and arrangement of diodes and resistors are connected between first and second voltage sources (VCC and a ground terminal), as illustrated in FIG. 5. A resistor R4 is connected between the comparator 502 output terminal and first voltage source.

By connecting to terminals 4 and 6, the first switch detection circuitry 404 is configured to monitor the switch state of switch $S_1'$ of power conversion circuitry 450. It will be understood that the first switch detection circuitry 404 may be configured to monitor the switch state of any switch by connecting the first input of the comparator 502 to input and output terminals of any switch (e.g. any of switches $S_2'$, $S_3'$, $S_4'$, $S_5'$, $S_6'$).

The first switch detection circuitry 404 has two operating states, as follows:

Operation State 1

Operation state 1 occurs when the voltage across terminals 4 and 6 ($V_{46}$) is less than a sum of on-state voltages (i.e. forward bias voltage drops) $V_{D1}$, $V_{D2}$ and $V_{D3}$ measured across diodes D1, D2 and D3, from the perspective of terminals 4 and 6.

That is, when $V_{46}$ is less than ($V_{D3} + V_{D2} - V_{D1}$), diodes D1 is forward bias (thereby conducting current) and diodes D2 and D3 are reverse bias (thereby blocking current). Therefore, the voltage at the first input terminal of the comparator 502 (between resistor R1 and D3) is equal to ($V_{46}+V_{D1}$).

Operation State 2

Operation state 2 occurs when the voltage across $V_{46}$ is greater than a sum of on-state voltages (i.e. forward bias voltage drops) $V_{D1}$, $V_{D2}$ and $V_{D3}$ measured across diodes D1, D2 and D3, from the perspective of terminals 4 and 6.

That is, when $V_{46}$ is greater than ($V_{D3}+V_{D2}-V_{D1}$), diode D1 is reverse bias (thereby blocking current) and diodes D2 and D3 are forward bias (thereby conducting current). Therefore, the voltage at the first input terminal of the comparator 502 (between resistor R1 and D3) is equal to ($V_{D2}+V_{D3}$).

Advantageously, in both operation states 1 and 2, any higher value of potential across terminals 4 and 6 above a Zener voltage of Zener diode D3 is effectively isolated from the comparator 502 by the diode D1. Similarly, the diode D2 may block any abnormal negative voltage across terminals 4 and 5.

Advantageously, Zener diode D3 maintains a stable voltage at the first input terminal of the comparator 502. That is, if the voltage between terminals 4 and 6 rises above the Zener voltage, the diode D1 would be reverse biased and the first switch detection circuitry 404 would be isolated from high voltage levels that occur during OFF state of the power switch $S_1'$. In order to provide such a stable voltage, the Zener voltage of D3 is set according to equation (3) below:

$$V_{D3} > \text{(a maximum on-state power rating of switch } S_1') + V_{D1} + \text{tolerance} \qquad (3)$$

In order to detect a switch state of switch $S_1'$, the voltage generated at the first input terminal of the comparator 502 is compared to a voltage generated at the second input terminal of the comparator 502 (i.e. a reference voltage). The voltage generated at the second input terminal of the comparator 502 is set by variable resistor R3. By varying the resistance of R3, the voltage generated at the second input terminal between resistors R2 and R3 is adjusted.

When the first switch detection circuitry 404 is arranged as discussed above in relation to FIG. 5, the voltage of R3 ($V_{R3}$) is set as follows: ($V_{46}+V_{D1}<V_{R3}$) and ($V_{D3}+V_{D2}>V_{R3}$). Furthermore, the voltage at the second input terminal ($V_-$) of the comparator 502 is set as follows: (V−>(a maximum on-state power rating of switch $S_1'$)+$V_{D1}$) and (V−<(VD3+VD2)).

As such, in operation state 1, $V_{46}+V_{D1}<V_{R3}$ and the comparator 502 outputs a low binary value (equal to the voltage generated at the ground terminal, for example zero). In operation state 2, ($V_{D3}+V_{D2}$)>$V_{R3}$ and the comparator 502 outputs a high binary value (equal to the voltage generated at VCC).

In the example illustrated in FIG. 5, the comparator output drives an optocoupler 504 connected between VDD and the ground terminal. A resistor R5 is connected between VCC and the optocoupler. The output of the optocoupler indicates the switch state of $S_1'$ (i.e. $SS_1'$).

The output of the optocoupler is VDD if the comparator 502 outputs a low binary value. The output of the optocoupler is a voltage proportional to a voltage generated at the ground terminal if the comparator 502 outputs a high binary value. That is when $S_1'$ is ON, the first switch detection circuitry 404 operates in operation state 1 and an output of optocoupler is VDD or logic 1 indicating ON-state. When the switch is OFF, the voltage across $S_1'$ is hundreds of volts and the first switch detection circuitry 404 operates in operation state 2 where an output of optocoupler is VGND or logic 0 indicating OFF-state.

In some examples, the diode D2 can be removed and D3 may be replaced by a resistor (e.g. R6). In examples where R6 is used instead of D3, a voltage of $V_{RD3}$ appears at the first input terminal instead of $V_{D3}+V_{D2}$. That is, if a voltage less than $V_{RD3}$ is applied across terminals 4 and 6, the diode D1 would be forward biased and the current drawn would generate a voltage at the first input terminal of $V_{RD3}=V_{46}+V_{D1}$. If a voltage greater than $V_{RD3}$ is applied across terminals 4 and 6, the diode D1 would be reverse biased and the voltage generated at the first input terminal would be $V_{RD3}=VCC*R_{D3}/(R1+RD3)$.

Advantageously, the first switch detection circuitry 404 eliminates the need for gate voltage measurements in order to acquire switching states. Further, the first switch detection circuitry 404 improves the safety of switch state acquisition by providing isolation from high voltages at the comparator 502 and the first and second processing circuitry 402, 406. That is, by using high reliability diodes for D1 and D2, the comparator 502 and first and second processing circuitry 402, 406 are electrically isolated from the power device in case of faults. The isolation by optocoupler 504 further protects the processing circuitry from high voltage on the switch side.

In some examples, a fuse 506 may be provided between the diode D1 and terminal 4 to improve electrical isolation during a fault.

Returning back to capacitor current reconstruction with respect to FIG. 4, the output (load) side DC-link current ($I_{DC-}$) is determined by summing the switch currents $I_{S1}'$, $I_{S2}'$, and $I_{S3}'$, as shown in equation (4), below. The switch currents are obtained as the product of switching states and corresponding phase currents. This processing can be done using either analog circuits or digitally using a digital signal processing.

$$I_{DC-}=SS_1'*I_A+S_3'*I_B+SS_5'*I_C \qquad (4)$$

The method for input side DC-link current estimation ($I_{DC+}$) is different for PFE and AFE. In PFE, as the diodes are unidirectional, additional circuits is not necessary and $I_{DC+}$ can be determined as the sum of currents flowing toward the power conversion circuitry 450. Assuming the currents flowing toward the converter are positive, this can be expressed as illustrated in FIG. 5, below, $$I_{DC+}=I_a+I_b+I_c \text{ (only the currents with positive sign)} \qquad (5)$$

In AFE, as controllable switches are used, the DC-link current ($I_{DC+}$) determination uses the same method as used for $I_{DC-}$, as discussed above.

The DC-link capacitor current is reconstructed as the sum of $I_{DC+}$ and $I_{DC-}$.

FIG. 6

Figure 6:
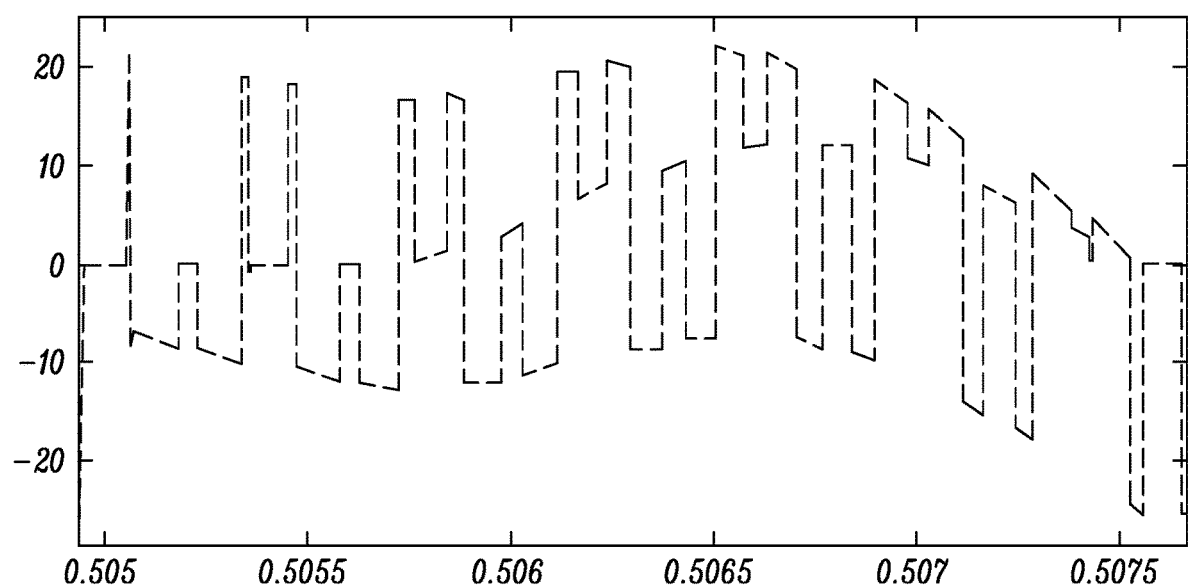
FIG. 6 is a graphical representation of reconstructed capacitor current.

Referring to FIG. 6, a PSpice simulated graph illustrates a comparison of a capacitor current measured in an inverter (dashed line) compared to a digital implementation of capacitor current reconstruction as discussed above, validated using MATLAB Simulink (solid line). The x-axis indicates time in seconds and the y-axis indicates capacitor current in Amperes.

Upon reconstructing the DC-link capacitor current, the second processing circuitry 406 of the monitoring circuitry 400 uses the capacitor current to monitor a condition (i.e. health/degradation) of the DC-link capacitor. Indicators used for monitoring a condition include capacitor voltage, capacitor current and/or ambient temperature, as discussed in detail below with reference to FIG. 7.

FIG. 7

Figure 7:
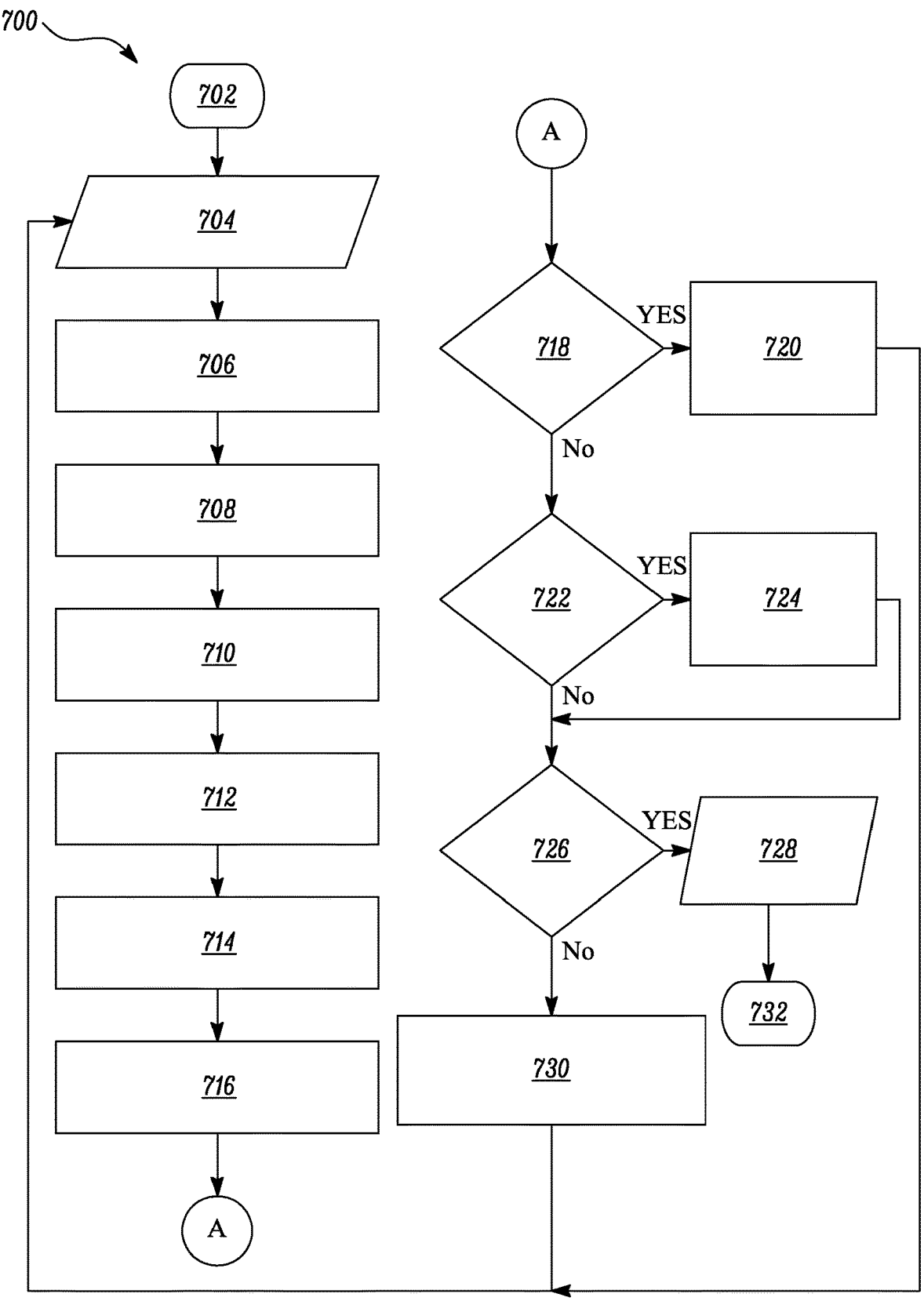
FIG. 7 is a schematic representation of another method of monitoring power conversion circuitry.

An exemplary method 700 of capacitor condition monitoring using monitoring circuitry 400 is shown in FIG. 7. The monitoring method 700 comprises:

702 the monitoring method starts;

704 measuring required signals, such as input currents, output currents, DC-link voltage, and ambient temperature (e.g. using temperature sensor (T) of FIG. 4); 706 reconstructing the AC capacitor current (i.e. DC-link current) from input currents, output currents and switching states extracted using the first switch detection circuitry 404, discussed above in relation to FIG. 5;

708 extracting an AC component (i.e. ripple voltage) of the capacitor voltage (i.e. DC-link voltage) using high pass filter circuitry (not shown);

710 extracting capacitor voltage and capacitor current signals at difference frequencies of interest (i.e. dominant components based on the power conversion circuitry's operation frequencies) using Fast Fourier Transform (FFT), the Goertzel algorithm and/or band pass filter circuitry;

712 determining a capacitor impedance (Z) at the frequencies of interest using an amplitude of the reconstructed capacitor current (I) and an amplitude of the extracted capacitor voltage (V) (i.e. Z=V/I);

714 determine a capacitance of the capacitor and ESR of the capacitor using the determined capacitor impedance and $\theta$ (i.e. Capacitance=Z sin $\theta$ and ESR=Z cos $\theta$);

716 determine a core temperature of the capacitor using the determined capacitor impedance, at frequencies of less than 500 Hz, as the temperature sensitive electrical parameter (TSEP) (i.e. $T_{CORE}=T_{AMB}+K*\Delta Z$, where TCORE is core temperature and K is temperature coefficient of Z);

718 is the monitoring circuitry 400 in learning mode? If YES, proceed to 720. If NO, proceed to 722;

720 during learning mode, storing values of capacitance and ESR vs core temperature to create a failure threshold database, before returning to 704;

722 monitoring time durations during which the power conversion circuitry 450 is turned off, using a battery powered clock (not shown). If the monitored off-period is more than a pre-set time, proceed to 724. If the monitored off-period is less than a pre-set time (or not off at all), proceed to 726;

724 calibrating the monitoring circuitry 400 (i.e. self-calibration) for ageing related changes in temperature estimation using impedance Z estimated after cooling down (i.e. after the pre-set time required for cool down). After calibration, proceed to 726. 726 comparing the determined capacitance and ESR against failure thresholds to identify any failures. If a failure is identified, proceed to 728. If no failure is detected, proceed to 730;

728 turn on an alarm indicating a failure, before proceeding to 732 where the monitoring method 700 stops; and 730 storing the monitored data (i.e. reconstructed capacitor current, capacitor voltage, core temperature, capacitor impedance, ESR and capacitance) at regular intervals, identifying any trends and estimating remaining useful life of the capacitor. Output the capacitor health status to the monitoring output stage of the monitoring circuitry 400.

The monitoring method 700 should be understood to monitor the power conversion circuitry 450 as described above in relation to FIG. 4 to FIG. 6.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A monitoring circuitry connectable to power conversion circuitry enclosed within packaging, the power conversion circuitry comprising terminals providing external connections to nodes of the power conversion circuitry enclosed within the packaging, the monitoring circuitry comprising:

a comparator comprising a first input terminals connectable to first and second terminals of the power conversion circuitry and a second input terminal connected to a reference voltage, wherein the first and second terminals provide external connections to first and second nodes connected along respective current paths each connected to switching circuitry of the power conversion circuitry enclosed within the packaging, wherein the comparator detects a switch state of the switching circuitry based on a voltage generated at the first input terminal and the reference voltage;

processing circuitry connected to the comparator and configured to monitor the power conversion circuitry based on the detected switch state and a signal of the power conversion circuitry; and first and second current sensors connectable to third and fourth terminals of the power conversion circuitry, respectively, wherein the third and fourth terminals provide external connections to third and fourth nodes connected along respective current paths each connected to a capacitor of the power conversion circuitry enclosed within the packaging, the first and second current sensors configured to generate sensed current signals for indicating currents flowing through the respective third and fourth nodes, wherein the processing circuitry is:

connected to an output of the comparator and the first and second current sensors, configured to generate a capacitor current signal, indicating a capacitor current flowing through the capacitor, based on the detected switch state and the sensed current signals, and configured to monitor a condition of the capacitor based on the generated capacitor current signal.

2. The monitoring circuitry according to claim 1, wherein the terminals of the power conversion circuitry provide the only external interface to the power conversion circuitry enclosed within the packaging.

3. The monitoring circuitry according to claim 1, the monitoring circuitry further comprising:

a first current path connectable to the second terminal of the power conversion circuitry and connected to first and second voltage sources;

a second current path connectable to the first terminal of the power conversion circuitry and connected to the first input terminal of the comparator and the first current path;

voltage divider circuitry connected along the first and second current paths; and a unidirectional diode connected along the second current path, the unidirectional diode configured to block current from flowing towards the first input terminal of the comparator along the second current path, wherein:

the voltage divider circuitry and the unidirectional diode are configured to generate a voltage at the first input terminal of the comparator based on voltages generated by the switching circuitry at the first and second terminals of the power conversion circuitry.

4. The monitoring circuitry according to claim 3, wherein:
the comparator is configured to detect a low switch state of the switching circuitry when a voltage generated at the first input terminal of the comparator is less than a voltage generated at the second input terminal of the comparator, and
the comparator is configured to detect a high switch state of the switching circuitry when a voltage generated at the first input terminal of the comparator is greater than a voltage generated at the second input terminal of the comparator.

5. The monitoring circuitry according to claim 3, wherein the voltage divider circuitry comprises:
a voltage node connected along the first and second current paths,
a first impedance connected along the first current path between the voltage node and the first voltage source, and
a second impedance connected along the first current path between the voltage node and the second voltage source.

6. The monitoring circuitry according to claim 5, the monitoring circuitry being connected to the power conversion circuitry, wherein:
the unidirectional diode is connected to the first terminal of the power conversion circuitry,
the second impedance is connected to the second terminal of the power conversion circuitry,
the first current sensor is connected to the third terminal of the power conversion circuitry, and
the second current sensor is connected to the fourth terminal of the power conversion circuitry, and wherein:
optionally, the second terminal and the fourth terminal are the same terminal of the power conversion circuitry.

7. The monitoring circuitry according to claim 5, wherein the second impedance is a Zener diode configured to block current from flowing towards the second voltage source along the first current path only when a voltage across the Zener diode is greater than a predetermined voltage.

8. The monitoring circuitry according to claim 5, wherein the voltage divider circuitry comprises another unidirectional diode connected along the first current path between the Zener diode and the second voltage source, and wherein:
the other unidirectional diode is configured to block current from flowing towards the first terminal of the comparator along the first current path.

9. The monitoring circuitry according to claim 3, the monitoring circuitry further comprising:
a third current path connected to the first and second voltage sources in parallel with the first current path,
second voltage divider circuitry connected along the third current path and connected to the second input terminal of the comparator, wherein:
the second voltage divider circuitry is configured to generate the reference voltage at the second input terminal of the comparator.

10. The monitoring circuitry according to claim 9, wherein:
the second voltage divider circuitry comprises a variable impedance, and the second voltage divider circuitry is configured to vary the reference voltage generated at the second input terminal of the comparator by varying the variable impedance.

11. The monitoring circuitry according to claim 1, wherein:
the first current sensor is configured to generate an input current signal for indicating an input current flowing through the third node positioned along an input current path of the power conversion circuitry,
the second current sensor is configured to generate an output current signal for indicating an output current flowing through the fourth node positioned along an output current path of the power conversion circuitry, and
the processing circuitry is configured to generate the capacitor current signal based on the detected switch state, the input current signal and the output current signal.

12. The monitoring circuitry according to claim 1, the monitoring circuitry further comprising isolation circuitry connected between the processing circuitry and the output of the comparator.

13. The monitoring circuitry according to claim 12, wherein the isolation circuitry comprises an optocoupler, a pulse transformer, or a capacitive isolator.

14. The monitoring circuitry according to claim 13, the monitoring circuitry further comprising alternating current, AC, filter circuitry connectable to at least one terminal of the power conversion circuitry, the AC filter circuitry configured to detect a capacitor voltage signal of the capacitor, and wherein:
the processing circuitry is configured to determine a capacitor impedance of the capacitor based on an amplitude of the generated capacitor current signal and an amplitude of the detected capacitor voltage signal.

15. The monitoring circuitry according to claim 14, wherein the processing circuitry is configured to determine a capacitance of the capacitor and/or an equivalent series resistance, ESR, of the capacitor based on the determined capacitor impedance.

16. The monitoring circuitry according to claim 14, the monitoring circuitry further comprising a temperature sensor configured to measure an ambient temperature of the power conversion circuitry, and wherein:
the processing circuitry is configured to determine a core temperature of the capacitor based on the determined capacitor impedance and the measured ambient temperature.

17. The monitoring circuitry according to claim 16, the monitoring circuitry further comprising clock circuitry, the clock circuitry configured to determine when the power conversion circuitry is inactive for greater than or equal to a predetermined duration, and wherein:
the temperature sensor is configured to determine a reference core temperature of the capacitor when the power conversion circuitry is determined to be inactive for greater than or equal to the predetermined duration, and
the processing circuitry is configured to calibrate core temperature estimation performed by the monitoring circuitry based on the determined impedance of the capacitor and the determined reference core temperature.

18. A method of monitoring power conversion circuitry enclosed within packaging, the power conversion circuitry comprising terminals providing external connections to nodes of the power conversion circuitry enclosed within the packaging, the method comprising:
  detecting a switch state of switching circuitry of the power conversion circuitry enclosed within the packaging with a comparator based on a voltage generated at a first input terminals and a reference voltage, the comparator comprising the first input terminals connectable to first and second terminals of the power conversion circuitry and a second input terminal connected to the reference voltage, wherein the first and second terminals provide external connections to first and second nodes connected along respective current paths each connected to the switching circuitry of the power conversion circuitry enclosed within the packaging;
  monitoring the power conversion circuitry based on the detected switch state and a signal of the power conversion circuitry with processing circuitry connected to the comparator,
    wherein first and second current sensors are connectable to third and fourth terminals of the power conversion circuitry, respectively, the third and fourth terminals providing external connections to third and fourth nodes connected along respective current paths each connected to a capacitor of the power conversion circuitry enclosed within the packaging, the first and second current sensors being configured to generate sensed current signals for indicating currents flowing through the respective third and fourth nodes, and the processing circuitry being connected to an output of the comparator and the first and second current sensors;
  generating a capacitor current signal, indicating a capacitor current flowing through the capacitor, based on the detected switch state and the sensed current signals; and
  monitoring a condition of the capacitor based on the generated capacitor current signal.

19. A computer-readable medium comprising instructions which, when executed on a computer of monitoring circuitry, cause the computer to monitor power conversion circuitry enclosed within packaging, the power conversion circuitry comprising terminals providing external connections to nodes of the power conversion circuitry enclosed within the packaging, the instructions causing the computer to monitor the power conversion circuitry by:
  detecting a switch state of switching circuitry of the power conversion circuitry enclosed within the packaging with a comparator based on a voltage generated at a first input terminals and a reference voltage, the comparator comprising the first input terminals connectable to first and second terminals of the power conversion circuitry and a second input terminal connected to the reference voltage, wherein the first and second terminals provide external connections to first and second nodes connected along respective current paths each connected to the switching circuitry of the power conversion circuitry enclosed within the packaging;
  monitoring the power conversion circuitry based on the detected switch state and a signal of the power conversion circuitry with processing circuitry connected to the comparator,
    wherein first and second current sensors are connectable to third and fourth terminals of the power conversion circuitry, respectively, the third and fourth terminals providing external connections to third and fourth nodes connected along respective current paths each connected to a capacitor of the power conversion circuitry enclosed within the packaging, the first and second current sensors being configured to generate sensed current signals for indicating currents flowing through the respective third and fourth nodes, and the processing circuitry being connected to an output of the comparator and the first and second current sensors;
  generating a capacitor current signal, indicating a capacitor current flowing through the capacitor, based on the detected switch state and the sensed current signals; and
  monitoring a condition of the capacitor based on the generated capacitor current signal.

* * * * *